No. 843,664.

PATENTED FEB. 12, 1907.

A. A. & G. F. CONRAD.
POULTRY FEEDING AND WATERING DEVICE.
APPLICATION FILED AUG. 31, 1906.

Witnesses
Carl Stoughton
J. G. Campbell

Inventors
Albert A. Conrad
George F. Conrad
by Shepherd & Parker
Attorneys

UNITED STATES PATENT OFFICE.

ALBERT A. CONRAD AND GEORGE F. CONRAD, OF AMANDA, OHIO.

POULTRY FEEDING AND WATERING DEVICE.

No. 843,664.            Specification of Letters Patent.            Patented Feb. 12, 1907.

Application filed August 31, 1906. Serial No. 332,738.

*To all whom it may concern:*

Be it known that we, ALBERT A. and GEORGE F. CONRAD, citizens of the United States, residing at Amanda, in the county of Fairfield and State of Ohio, have invented certain new and useful Improvements in Poultry Feeding and Watering Devices, of which the following is a specification.

Our invention relates to a poultry feeding and watering device, and has for its object the provision of a device of this character constructed in such manner that a limited amount of water and feed may be maintained accessible to the poultry at all times.

A further object of the invention is the provision of a device of the character described comprising a casing having a water-tank arranged therein, together with a valve for closing the outlet of said water-tank while said tank is being filled.

Further objects and advantages of the invention will be set forth in the detailed description which now follows.

Figure 1:
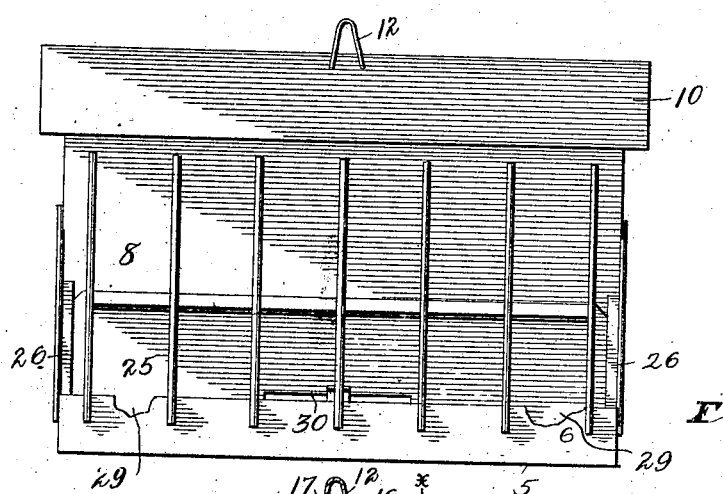
Figure 2:
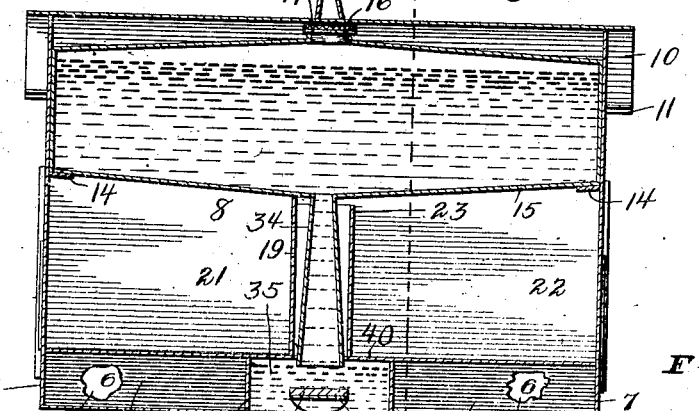
Figures 3, 4:
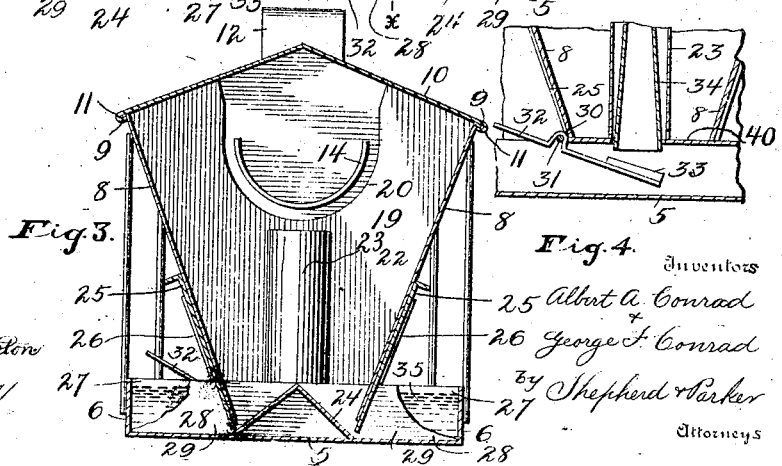

In the accompanying drawings, Figure 1 is a side elevation of a poultry feeding and watering device constructed in accordance with our invention. Fig. 2 is a longitudinal vertical section of the same. Fig. 3 is a transverse vertical section upon line x x of Fig. 2 with the water-tank removed, and Fig. 4 is a detail transverse section illustrating a valve hereinafter described.

Like numerals designate corresponding parts in all of the figures of the drawings.

The present device consists of a base, which comprises a bottom 5, side walls 6, and end walls 7. The end walls 7 are extended vertically to form the ends of a casing, said end walls 7 being connected by inclined side walls 8. These side walls are provided with outturned flanges 9, and a sliding cover 10 is provided with bent-over edges 11, which are adapted to engage said flanges 9. A handle 12 provides means for sliding the cover upon or from the flanges. Brackets 14 are secured to the end walls 7 and serve to support a water-tank 15. This tank has a threaded opening 16 formed therein, which is normally closed by a cap 17. The casing is spanned by a transverse wall 19, which is cut away, as at 20, for the reception of the water-tank 15. This transverse wall divides the casing into two chambers 21 and 22. Mounted upon the face of the wall 19 is a tube 23. V-shaped bottoms 24 are provided for the chambers 21 and 22, the side walls 8 terminating just short of these bottoms.

Slides 25, which extend the full length of the casing, are slidably disposed in ways formed by strips 26. Transverse walls 27 and 28 separate the feed-boxes 29 from the water-cup. These walls extend entirely across the bottom 5, the slides 25 being cut away, as at 30, to accommodate this water-cup. Pivoted at 31 is a lever 32, upon the inner end of which is mounted a rubber or leather disk 33, said lever and disk forming a valve. A pipe 34 extends from the water-tank 15 through the tube 23 into the water-cup 35, which is formed by the side walls 27 and 28.

From the foregoing description it will be seen that the present device comprises a rectangular base-pan, into which the lower portion of the casing projects, leaving, however, a space between the casing and the side walls 6 upon each side of said casing. The water-cup 35, extending across the central portion of this base, divides the base into three divisions, the two end divisions forming the food-cups, while the central division forms the water-cup, the top 40 of said water-cup preventing the passage of feed from the compartments 21 and 22 thereto.

The operation of the device is as follows: The sliding cover having been removed and the compartments 21 and 22 filled with feed, the water-tank is filled. While the water-tank is being filled the operator presses upon the outer end of the lever 32. This brings the disk 33 into such position as to close the lower end of the pipe 34. After the cap 17 has been screwed into position to form an airtight seal for the water-tank the valve is released and the water fills the water-cup up to the lower end of the pipe 34. The water will maintain this level, as will be readily understood, until the tank is entirely exhausted. The feed from the compartments 21 and 22 flows through the openings 36, (see Fig. 3,) the amount of feed which passes through said openings being controllable by means of the slides 25. A series of bars 37 extend from the side walls 6 of the base to the side walls 8 of the casing, said bars being preferably soldered into position. By virtue of this construction the fowls are required to place their heads between the bars to get the feed or water and it is impossible for them to walk in the feed-compartments or the water-cup.

From the foregoing description it will be seen that simple and efficient means are herein provided for accomplishing the objects of the invention; but while the elements shown and described are well adapted to serve the purpose for which they are intended it is to be understood that our invention is not limited to the precise construction set forth, but includes within its purview such changes as may be made within the scope of the appended claims.

What we claim is—

1. A device of the character described, comprising a casing which is divided into feed-compartments, and a water-cup extending entirely beneath said compartments and projecting beyond each side of the casing, the side walls of the feed-compartments terminating short of the bottoms of said feed-compartments, means for controlling the flow of feed from said compartments and a centrally-located water-tank for supplying water to said water-cup.

2. A device of the character described, comprising a casing which is divided into feed-compartments, and a water-cup extending entirely beneath said compartments and projecting beyond each side of the casing, the side walls of the feed-compartments terminating short of the bottoms of said feed-compartments, slides for controlling the flow of feed from said compartments and a centrally-located water-tank for supplying water to the water-cup.

3. In a device of the character described, the combination with a rectangular base divided into feed-compartments and a water-cup, of a casing of less width at its bottom than said base, the side walls of said casing terminating short of the bottom of said casing, slides for controlling the flow of feed from said casing to said feed-compartments, a water-tank located centrally above the feed-compartments, and a pipe carried by said water-tank which projects into said water-cup.

4. In a poultry feeding and watering device, the combination with a casing having inclined side walls, of a rectangular base portion, the side walls of the casing terminating short of the bottom of said base portion, slides which extend the full length of the base portion for controlling the flow of feed from the casing to the rectangular base portion, vertical bars the ends of which are secured to the upper portion of the casing and to the outer wall of the rectangular base portion, transversely-extending walls extending across said base portion beneath the casing and forming a water-cup which projects upon opposite sides of the casing, and a water-tank centrally located within the casing and having a depending pipe which projects into the water-cup.

5. In a poultry feeding and watering device, the combination with a casing having inclined side walls, of a rectangular base portion, the side walls of the casing terminating short of the bottom of said base portion, slides which extend the full length of the base portion for controlling the flow of feed from the casing to the rectangular base portion, vertical bars the ends of which are secured to the upper portion of the casing and to the outer wall of the rectangular base portion, transversely-extending walls extending across said base portion beneath the casing and forming a water-cup which projects upon opposite sides of the casing, a water-tank centrally located within the casing and having a depending pipe which projects into the water-cup, and a guard-tube surrounding said depending pipe for preventing the passage of feed into the water-cup.

6. In a poultry feeding and watering device, the combination with a casing having inclined side walls, of a rectangular base portion, the side walls of the casing terminating short of the bottom of said base portion, slides which extend the full length of the base portion for controlling the flow of feed from the casing to the rectangular base portion, vertical bars the ends of which are secured to the upper portion of the casing and to the outer wall of the rectangular base portion, transversely-extending walls extending across said base portion beneath the casing and forming a water-cup which projects upon opposite sides of the casing, a water-tank centrally located within the casing and having a depending pipe which projects into the water-cup, a guard-tube surrounding said depending pipe for preventing the passage of feed into the water-cup, a lever pivoted in said water-cup, the outer end of which lies outside of the casing, and a valve carried by the inner end of said lever and adapted to close the lower end of said pipe.

In testimony whereof we affix our signatures in presence of two witnesses.

ALBERT A. CONRAD.
GEORGE F. CONRAD.

Witnesses:
S. H. SIMON,
D. J. SCHLEICH.